(12) United States Patent
Harrison et al.

(10) Patent No.: US 9,211,013 B2
(45) Date of Patent: Dec. 15, 2015

(54) RESISTIVE SUPPORT MECHANISM

(75) Inventors: Patrick N. Harrison, Aurora (CA);
James R. Edwards, Aurora (CA); Ken W. Vandervelden, Bolton (CA);
Thomas N. Banks, Holland Landing (CA); David R. Gater, Holland Landing (CA)

(73) Assignee: CoreChair Inc., Aurora (CA)

( * ) Notice: Subject to any disclaimer, the term of this patent is extended or adjusted under 35 U.S.C. 154(b) by 154 days.

(21) Appl. No.: 13/988,712

(22) PCT Filed: Nov. 24, 2011

(86) PCT No.: PCT/CA2011/050733
§ 371 (c)(1),
(2), (4) Date: May 21, 2013

(87) PCT Pub. No.: WO2012/068688
PCT Pub. Date: May 31, 2012

(65) Prior Publication Data
US 2013/0241253 A1    Sep. 19, 2013

Related U.S. Application Data

(60) Provisional application No. 61/417,258, filed on Nov. 25, 2011, provisional application No. 61/475,010, filed on Apr. 13, 2011.

(51) Int. Cl.
*A47C 3/026* (2006.01)
*A47C 3/025* (2006.01)
(Continued)

(52) U.S. Cl.
CPC ............... *A47C 3/0252* (2013.01); *A47C 1/027* (2013.01); *A47C 3/026* (2013.01); *A47C 3/30* (2013.01); *A47C 7/022* (2013.01); *A47C 7/14* (2013.01); *A47C 9/002* (2013.01); *F16M 11/14* (2013.01)

(58) Field of Classification Search
CPC ...... A47C 3/0252; A47C 3/025; A47C 3/026; A47C 9/002; A47C 1/027; A47C 3/30; A47C 7/022; A47C 7/14; F16M 11/14

USPC .......... 297/258.1, 270.1, 344.21, 463.1, 313; 248/603, 560; 267/131, 150
See application file for complete search history.

(56) References Cited

U.S. PATENT DOCUMENTS 3,220,668 A    11/1965  Baerman
5,170,997 A    12/1992  Girard et al.
(Continued)

FOREIGN PATENT DOCUMENTS

DE    44 00 395    7/1994

*Primary Examiner* — Milton Nelson, Jr.
(74) *Attorney, Agent, or Firm* — Elan IP, Inc.

(57) ABSTRACT

A motion support mechanism, for example for a chair, joined to a mounting surface and to a base for providing resistive support to the mounting surface as the mounting surface undergoes one or both of rotational and tilt movement relative to the base. The motion support mechanism includes a support bearing connected to the mounting surface and to the base which permits one or both of tilting and rotational motion of the mounting surface relative to the base, a pivot ball sized fixedly attached to a portion of the base, and, a resistance cartridge fixedly connected to the mounting surface such that the resistance cartridge undergoes movement relative to the base and applies a resistive force on the base as the mounting surface undergoes one or both of rotational and tilt movement. The resistance cartridge includes a cartridge housing and a resilient member in contact relation with the pivot ball and with a wall of the housing such that the resilient member is compressed by the relative movement between the resistance cartridge and the pivot ball to thereby provide the resistive support to the mounting surface. Preferably, the resistive support also provides a dampening feature, for example by way of the resilient member being formed from a viscoelastic material. A means for varying the resistance applied is provided that permits the distance between the bearing surface and the pivot ball to be varied.

20 Claims, 15 Drawing Sheets

(51) Int. Cl.
*A47C 1/027* (2006.01)
*A47C 3/30* (2006.01)
*A47C 7/02* (2006.01)
*A47C 9/00* (2006.01)
*F16M 11/14* (2006.01)
*A47C 7/14* (2006.01)

(56) References Cited

U.S. PATENT DOCUMENTS

| | | | |
|---|---|---|---|
| 5,203,853 A | 4/1993 | Caruso | |
| 5,769,492 A * | 6/1998 | Jensen | 297/314 |
| 6,176,548 B1 | 1/2001 | Chen et al. | |
| 6,209,958 B1 | 4/2001 | Thole | |
| 6,382,724 B1 | 5/2002 | Piretti | |
| 6,481,795 B1 | 11/2002 | Pettibon | |
| 7,100,983 B1 | 9/2006 | Gant | |
| 8,540,314 B2 * | 9/2013 | Fernandez | 297/314 |
| 2004/0183343 A1 * | 9/2004 | Probst | 297/195.1 |
| 2009/0230743 A1 * | 9/2009 | Derakhshan et al. | 297/329 |
| 2010/0072801 A1 | 3/2010 | Adelsperger et al. | |

\* cited by examiner

RESISTIVE SUPPORT MECHANISM

This application claims priority from U.S. Provisional Application No. 61/417,258, filed on Nov. 25, 2010 and from U.S. Provisional Application No. 61/475,010 filed on Apr. 13, 2011, the contents of both of which, in their entirety, are herein incorporated by reference.

FIELD OF THE INVENTION

The present invention relates generally to the field of control and support mechanisms, and more particularly to a resistive support mechanism, preferably for use in a chair.

BACKGROUND OF THE INVENTION

Various motion control and support devices are known in art to control and support tilt and/or rotational motion. Common prior art examples are found in chairs, such as office chairs that offer a variety of options for adjusting the tilt on a chair or restricting the degree to which a user of the chair is able to adjust and/or control the motion of the chair. A common example are office chairs that have various degrees of freedom and ranges of motion aimed at providing mobility, flexibility and optimal ergonomic positioning with minimal dynamic action. On problem associated with such prior art ergonomic designs is that they allow for an individual fit, but rarely are they readjusted as often as they should, so a user ends up sitting in a fixed position for prolonged periods of time when seated at an office desk. For example, these chairs are able to swivel, flexibly tilt in limited fore and aft plans and be raised and lowered as required by a user. Various mechanisms have been proposed or otherwise known in the art to provide some of the above-mentioned features. There are conventional adjustable chairs where adjustment is possible by way of several, independent adjusting means, to adjust, for example, chair height, angle, etc. In addition, active adjustment chairs provide for multi-directional adjustment based on the seating position of a user. Some problems associated with prior art systems include the complexity of the mechanisms involved, difficulty in operation, lack of fluid control over the motion of the tilt and/or rotation of the chair.

Furthermore, other resistive support devices have been used where control and dampening of the motion available is more important, or where temporary motion may be desirable. These include, for example, construction worker supports, mining support devices, and exercise equipment. In the exercise equipment example, prior art support devices aim to provide a resistance against movement of a user, while the user is either trying to maintain a constant position or is otherwise partaking in an exercise activity. Resistive support devices in this example are generally targeted at improving the core strength of a user.

The various prior art devices are generally restricted in the range of motion they support, and in the resistive forces that are applied. That is, resistive support is provided for only a small range of motion. Furthermore, prior art devices and mechanisms for providing such resistive support are generally not readily adaptable to different applications, and do not provide variable resistance throughout the range of motion. Furthermore, in the case of resistive support devices provided on chairs, such resistive support devices have heretofore been inadequate in providing core support and strengthening to a user on the chair, and have not provided a full range of resistive support throughout a full range of tilt and rotational motions. Some shortcomings of these prior art designs include a requirement that a pivot point for motion be at a distance significantly below the user's centre of mass, thereby requiring the user to lean their body more than to mobilize their pelvic and lower back skeletal structure minimizing their significant to the action of an active sitting surface. Some examples of such prior art devices include those shown in U.S. Pat. No. 7,547,067 to Keilhauer and U.S. Pat. No. 6,997,511 to Marchand.

One such example of a prior art chair having a resistive support mechanism is shown in U.S. Pat. No. 6,209,958 issued Apr. 3, 2001 to Thole et al. Thole discloses one way of implementing a tilt control mechanism on a seating assembly. However, the Thole mechanism, while providing for universal tilt, does not allow for a full range of positions in which the chair can be locked, or for full flexibility in the degree of resistance. Thole discloses a tilt control mechanism for a char, where the tilt control mechanism defines a pivot connection between a seat assembly and a base, whereby the seat assembly effectively pivots about a pivot point in any direction extending radially from the pivot point. The tilt control mechanism includes an annular elastomeric ring which resists multi-directional tilting by mimicking a spring effect in the resistance, and further biases the seat assembly to a neutral position. The elastomeric ring has a contact area on which the tilting moment of the seat assembly acts which contact area can be selectively varied to adjust tilting resistance. Accordingly, the Thole mechanism tends to be large and bulky where a wide range of resistances is required. Furthermore, there is no discussion in Thole or features provided that result in proper support for the core muscles in a user's body. There is therefore a need in the art for a tilt mechanism for a chair, or other support surface, that addresses at least one of the deficiencies of Thole.

It is therefore an object of the invention to provide a novel resistive support mechanism for use with surfaces designed to support a user, such as chairs.

SUMMARY OF THE INVENTION

According to one embodiment of the invention, there is provided a resistive motion support mechanism, for example for a chair, joined to a mounting surface and to a base for providing resistive support to the mounting surface as the mounting surface undergoes one or both of rotational and tilt movement relative to the base. The motion support mechanism includes a support bearing connected to the mounting surface and to the base which permits one or both of tilting and rotational motion of the mounting surface relative to the base, a pivot ball fixedly attached to a portion of the base, and, a resistance cartridge fixedly connected to the mounting surface such that the resistance cartridge undergoes movement relative to the base and applies a resistive force on the base as the mounting surface undergoes one or both of rotational and tilt movement. The resistance cartridge preferably includes cartridge housing and a resilient member in contact relation with the pivot ball and with a wall of the housing such that the resilient member is compressed by the relative movement between the resistance cartridge and the pivot ball to thereby provide the resistive support to the mounting surface.

According to one aspect of the invention, the resilient member is preferably is selected from the group comprising an elastomeric ring, a silicone member, a dampening gel, a viscoelastomer, a bonded dampening material and a combination of same According to another aspect of the invention, the pivot ball includes an integral, rigid extension element and the resilient member is in contact relation with the rigid extension element and with said wall of said housing.

According to another aspect of the invention, the resilient member includes one or more gels in contact relation with each other.

According to another aspect of the invention, the one or more gels is preferably a first gel in contact with the first resilient member, and a second gel in contact with the first gel and with the wall of the housing; wherein the second gel has a higher density than the first gel.

According to another aspect of the invention, the resilient member is adapted to bias the mounting surface to a home position.

According to another aspect of the invention, wherein the housing of the resistance cartridge includes a bearing surface for receiving at least a portion of the support bearing.

According to another aspect of the invention, there is further provided a means for locking the resistance cartridge at a position in which the mounting surface has undergone the movement relative to the base According to another aspect of the invention, there is further provided a rigid plate connected to an underside of the resilient member, wherein the rigid plate has a surface having a plurality of locking elements on a surface distal to the resilient member, and wherein the means for locking comprises a locking pad having a surface of complimentary locking elements adapted to be brought into contact with the plurality of locking elements on the rigid plate.

According to another aspect of the invention, there is further provided a brake lever for moving the locking pad into and out of contact with the rigid plate.

According to another aspect of the invention, there is further provided a protruding element extending from the support bearing, and the resistance cartridge further comprising a locking surface for receiving the protruding element; wherein the locking surface provides a region of contact with the protruding element that is adapted to be brought into friction fit contact relationship with the protruding element upon activation of the means for locking.

According to another aspect of the invention, the means for locking comprises an adjustment lever adapted to bring the locking surface into the friction fit contact with the protruding element.

According to another aspect of the invention, the locking surface is provided on a portion of the housing of the resistance cartridge, and the adjustment lever comprises a height adjustment lever adapted to raise or lower the portion of the housing into and out of the friction fit contact relationship.

According to another aspect of the invention, the locking surface further restricts movement of the protruding element such that a maximum range of tilt around the support bearing is approximately fourteen degrees.

According to another aspect of the invention, there is further provided a means for varying the resistive force.

According to another aspect of the invention, the means for varying said resistive force comprises a means for varying the distance between said support bearing and said pivot ball such that said pivot ball is functionally attached at a variable position on said base.

According to another aspect of the invention, the means for varying the distance comprises a spring within the housing and adapted to apply a force onto the resistance cartridge.

According to another aspect of the invention, the housing includes two or more stepped notches offset vertically from each other and the resistance lever is moveable between each of the two or more stepped notches to vary the effective length of the spring.

According to another aspect of the invention, the stepped notches are further offset horizontally from each other to facilitate moving the resistance lever between each of the notches.

According to another aspect of the invention, the means for varying the resistive force includes a means for varying a contact area on the base on which the resistance cartridge applies the resistive force to thereby vary the resistive force.

According to another aspect of the invention, the means for varying a contact area includes a vertical position adjustment mechanism effective to increase or decrease the distance between the support bearing and the pivot ball to thereby vary a distance between a point of contact of the resistive force and a point about which the tilt motion occurs resulting in a varying of the resistive force applied onto the base.

According to another aspect of the invention, the mounting surface is adapted to mount the base of a seat thereon, and the base comprises the base of a chair.

According to another embodiment of the invention, there is provided a chair having a chair base, a seat and a motion support mechanism as herein described, wherein the seat is mounted onto the mounting surface and the chair base is integral with the base of the motion support mechanism.

According to another embodiment of the invention, there is provided a chair having a seat, a base, and a motion support mechanism joined to the base and the seat. The motion support mechanism providing resistive support to the seat as the seat undergoes one or both of rotational- and tilt movement relative to the base. The motion support mechanism includes a support bearing connected to the seat and to the base which permits one or both of tilting and rotational-motion of the seat relative to the base, a pivot ball sized fixedly attached to a portion of the base, and a resistance cartridge fixedly connected to the seat such that the resistance cartridge undergoes movement relative to the base and applies a resistive force on the base as the seat undergoes the one or both of rotational- and tilt movement. The resistance cartridge preferably includes a housing and a resilient member in contact relation with the pivot ball and with a wall of the housing such that the resilient member is compressed by the relative movement between the resistance cartridge and the pivot ball to thereby provide the resistive support to the seat.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
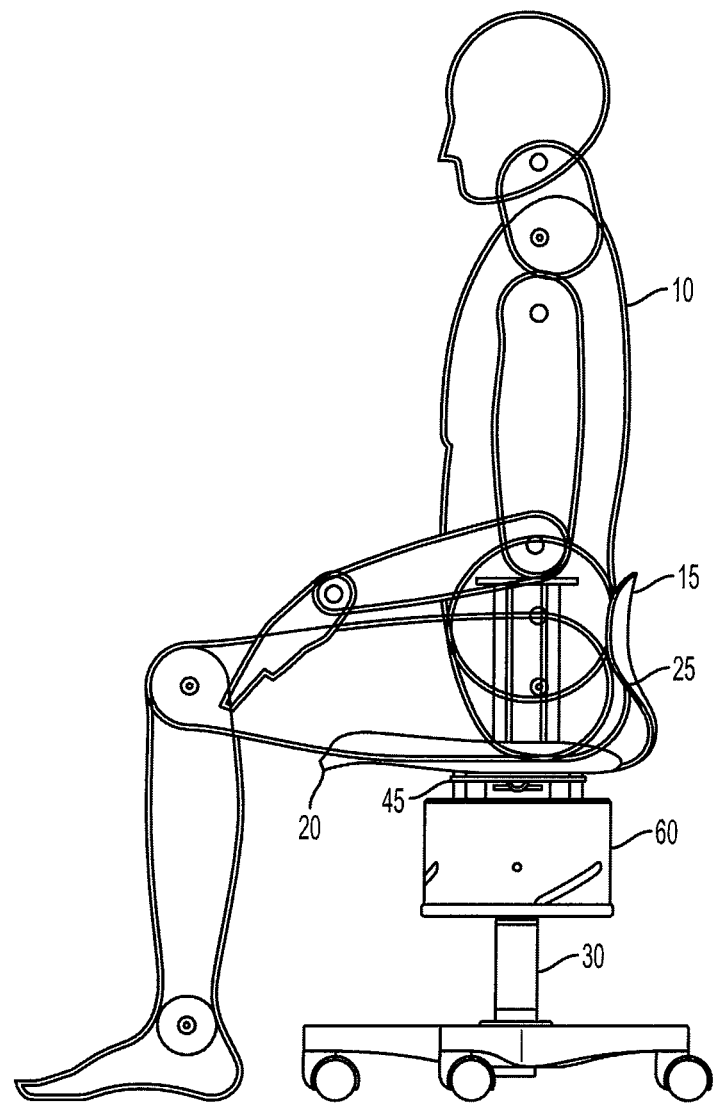
FIG. 1 shows a user sitting on a chair incorporating the resistive motion support mechanism according to the invention.

The preferred embodiments of the invention as described hereinbelow teach a motion support mechanism capable of providing resistive support, and referred to interchangeably as a motion support mechanism and a resistive motion support mechanism. In the preferred embodiment, the invention is applied for use with a chair, such as an office chair. The resistive support mechanisms described herein, help in providing the additional benefit of improving core strength in a user on the seat and mobilize the joints of the pelvis and vertebrae, thereby for example preventing contractures and atrophy of the supportive soft tissue and in fact enhancing the endurance of the relevant supportive musculature around these joints to counter the potential of back pain and injury as a result of chronic static sitting by allowing the user to be constantly counteracting the rotational motion of the ball. This ability to affect continuous movement and/or dynamic movement further aids in improving blood circulation, as well as the redistribution of sitting pressures to reduce pressure points which directly correlates to the sitting comfort of the user.

Some embodiments of the invention also allow the user to restrict this movement either by increasing/decreasing the resistance and or locking the system in a desired position. For example, one such desirable position would be such that the user is allowed to sit with their knees lower than their hips promoting a more upright pelvis and natural extension and balance of the spine. The invention also permits accommodation of mild to moderate orthopedic abnormalities allowing for an individual's hip, for example, to sit lower on one side versus the other and by doing so allow the spine to be erect whereas on a level fixed surface, the spine would be challenged to be upright further complicating spine balance and alignment, pain and injury. These features may also be advantageously used to accommodate other factors that affect proper pelvic positioning such as a wallet that might tend to cause a similar uneven positioning of the pelvis.

Furthermore, the motion support mechanism as herein described may be applied to other seating devices, such as dentists' chairs, lab stools, car seats, gaming chairs, leisure chairs such as bar stools, amusement park rides, children's school stools and similar devices where it would be beneficial to provide resistive support to a user. Other applications include devices meant to support a user in a standing position, such as construction support surfaces or pedestals. In the case of a dental hygienist using a hygienist's chair, for example, while the user reaches to perform their tasks, the free movement of the seat by way of the motion support mechanism prevents an acceleration of forces through the lower lumbar region of the user thereby reducing the potential of strains associated with this movement, which contributes to user pain and injury that may be experienced while sitting on a fixed level seating surface.

Figure 2A:
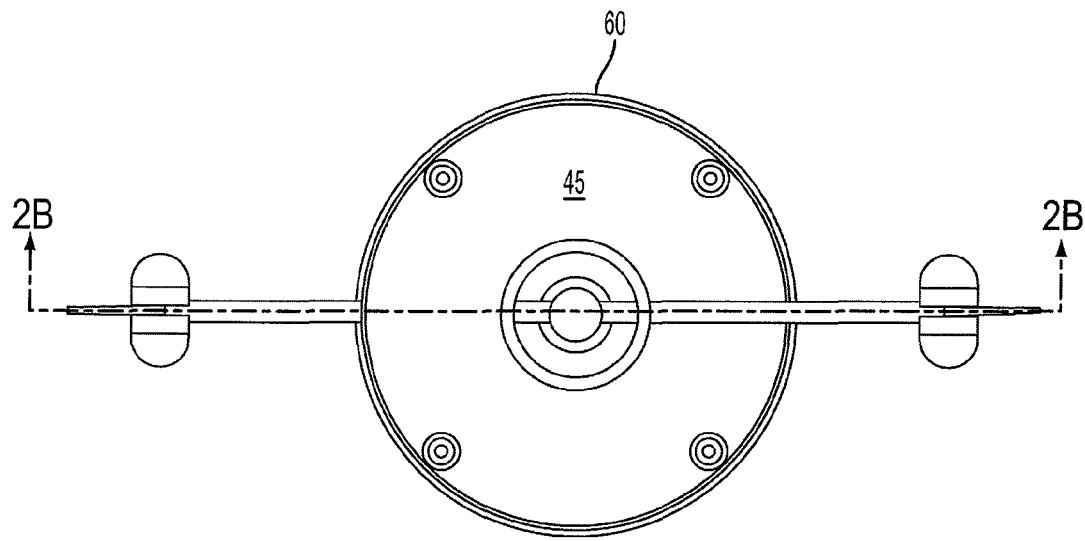
FIGS. 2A and 2B are top and sectional views, respectively of the resistive motion support mechanism according to an embodiment of the invention.
Figure 13A:
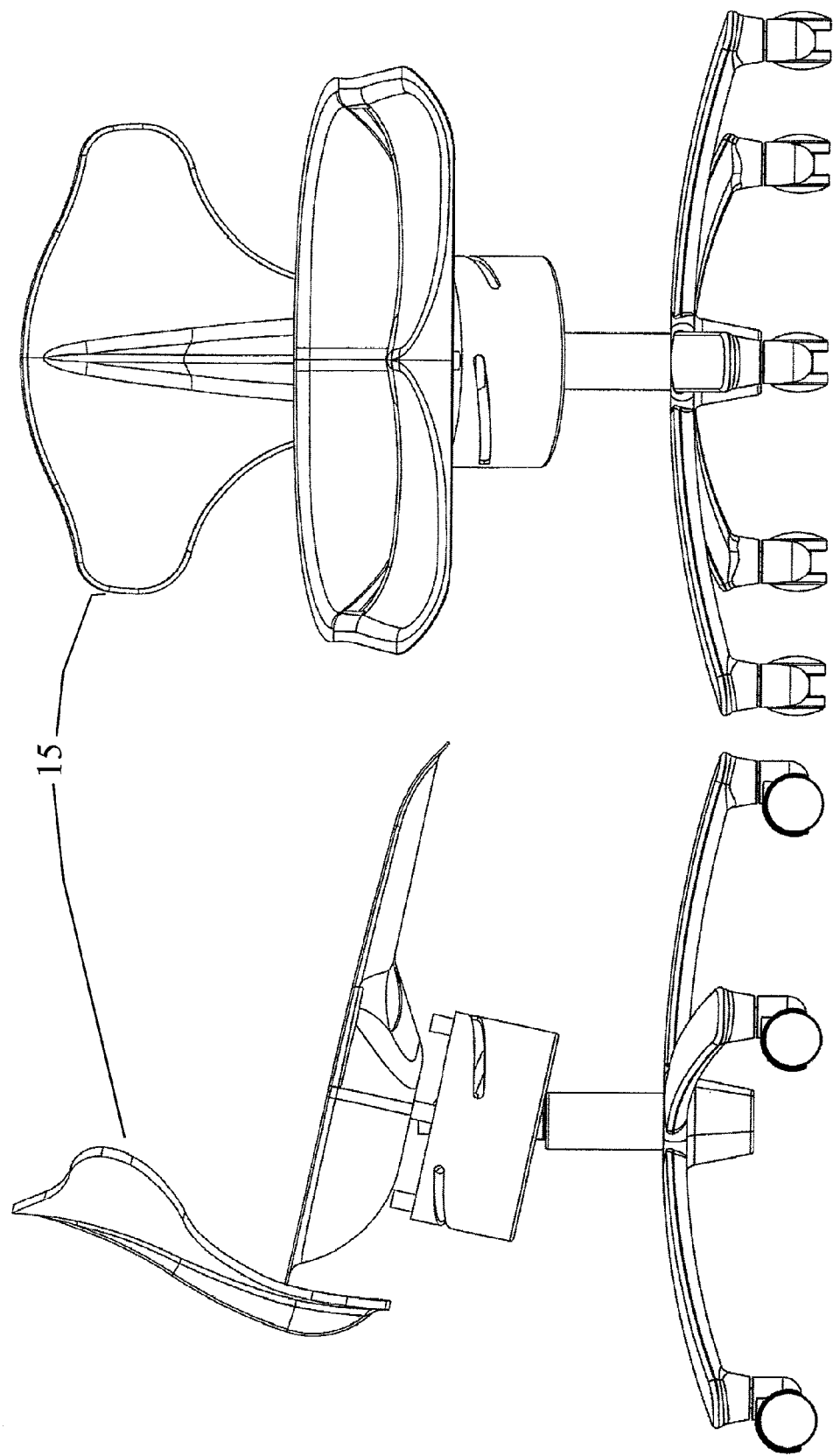
FIGS. 13A and 13B illustrate a chair having undergone tilt motion according to the invention.
Figure 13B:
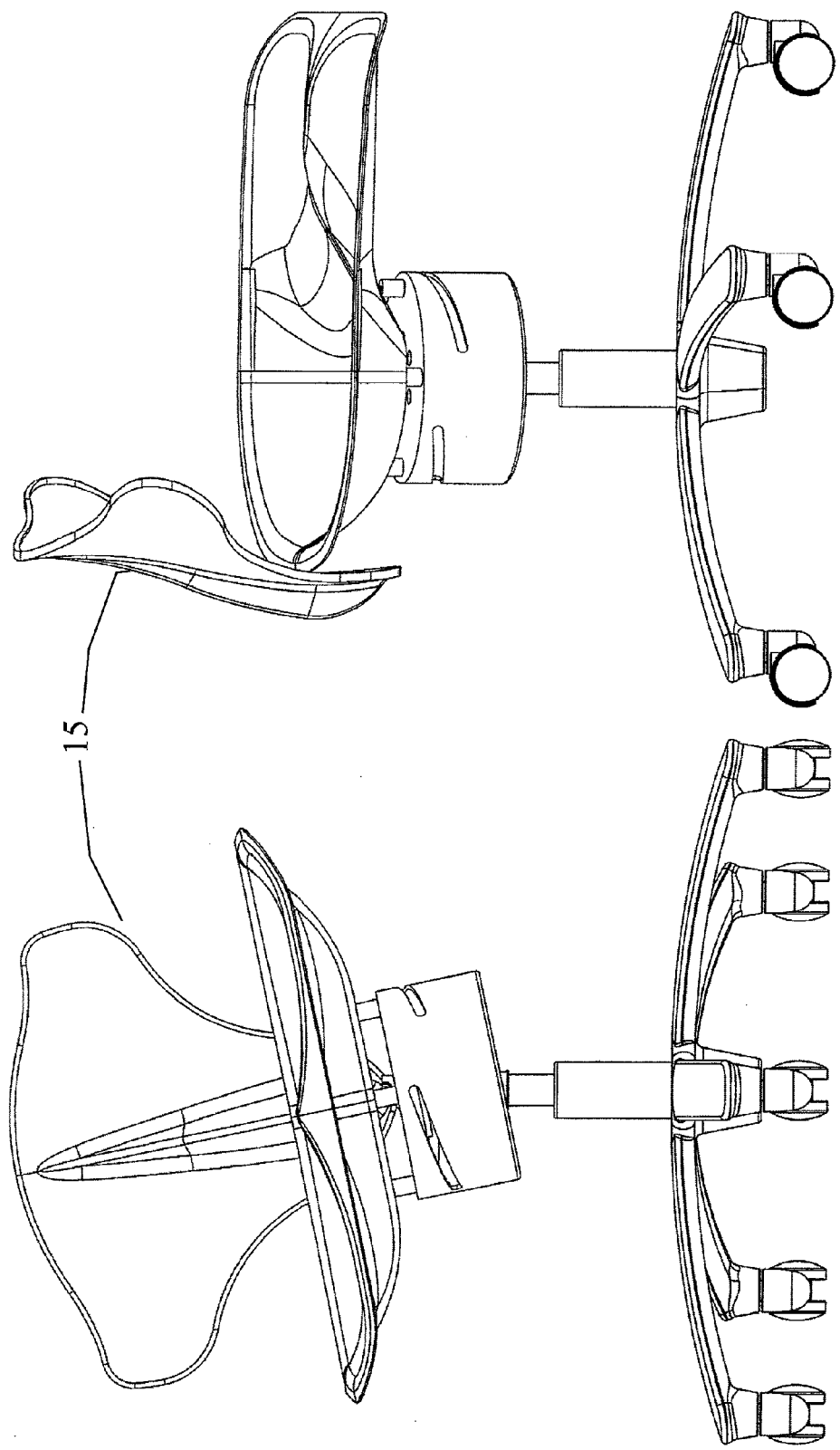

Referring now to FIG. 1, there is shown a user 10 seated on a chair 15. Chair 15 may include a seat portion 20, a backrest 25, a base 30, and a resistive support mechanism 40 (not shown in FIG. 1), within housing 60 according to the invention. An interface 45 is provided on the housing 60 and between the seat portion 20 for attaching the seat thereto. FIG. 2A shows a top view of the housing 60 and interface 45. Interface 45 is adapted to mount the seat of the chair thereon, and is alternatively referred to herein as a mounting surface. Chair 15 may further include various other elements known in the art, including but not limited to height adjustment mechanisms, arm rests, and various other adjustment devices that are otherwise unrelated to the resistive support mechanism as herein described. For clarity, in the description that follows, reference to a vertical axis refers to an axis coincidental with the cylindrical axis of the base 30. Reference to a horizontal axis refers to an axis perpendicular to the vertical axis. Furthermore, references to tilt and/or rotational motion have their ordinary meaning, wherein tilt motion refers to rotation about the horizontal axis and rotational motion refers to rotation about the vertical axis. The description further describes elements of the invention required to put the invention into practice and further sets forth a preferred embodiment as contemplated by the invention. However, various hardware and ordinary mechanical elements that would be used to assemble a mechanism or chair according to the invention may not be described and are considered within the abilities of a person skilled in the art. FIGS. 13A and 13B illustrate the chair 15 exhibiting two degrees of freedom in its motion, as the resistive support mechanism 40 of the present invention provides.

Figure 2B:
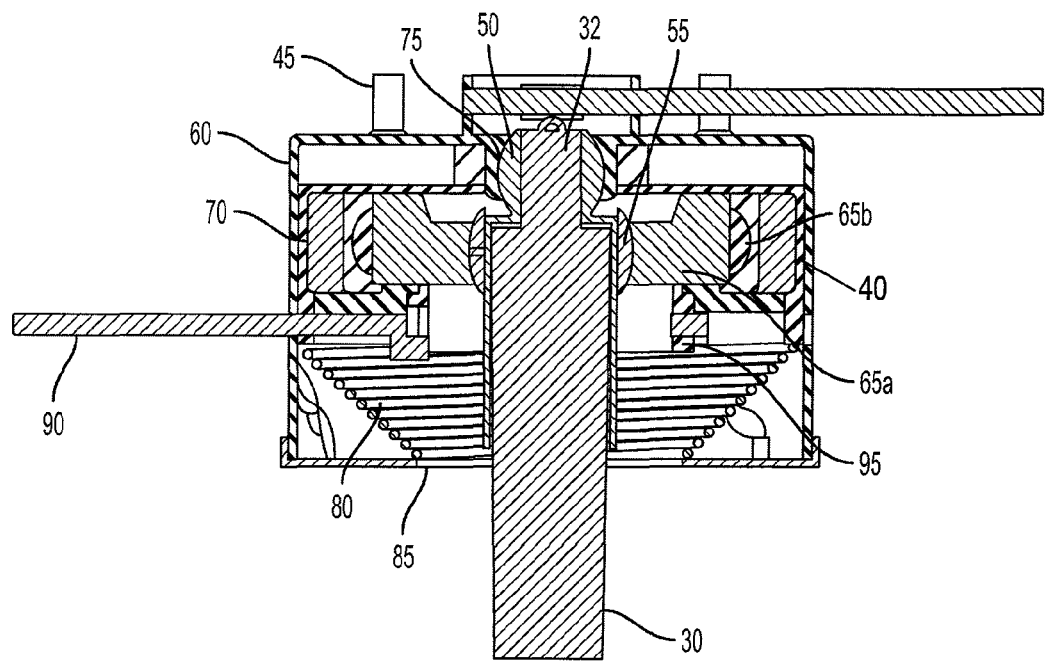

Referring to FIG. 2B, there is shown one embodiment of the resistive support mechanism according to the invention, including a support bearing 50 connected to the mounting surface 45 and to the base 30. Support bearing 50 permits one or both of tilting and rotational-motion of the mounting surface 45 relative to the base 30. Base 30 may include a shoulder portion 32 that is friction fit into the support bearing 50, such that base 30 does not move relative to the support bearing 50. Mounting surface 45 is free to tilt or -rotate with respect to the support bearing 50 such that support bearing 50 permits one or more of rotational or tilt movement of the mounting surface 45 relative to the base 30. A housing 60 is the main body of support for the mounting surface 45, which preferably includes stand-offs to fasten a seating surface to the mechanism is preferably provided to contain within it all or most of the elements of the resistive support mechanism. Preferably, the housing 60 also includes a bearing surface 75 for receiving at least a portion of the support bearing 50. The surfaces of support bearing 50 and bearing surface 75 will be provided such that minimal frictional forces are present between these surfaces so that movement on the support bearing 50 is relatively uninhibited. Housing 60 preferably extends directly from mounting surface 45 and is formed unitarily therewith. The functioning of bearings and bearing surfaces is generally known in the art and not further described herein. The invention also contemplates the use of functional alternatives to bearings and bearing surfaces that provide for the full two-degrees of freedom of movement made possible by support bearing 50 and bearing surface 75.

A pivot ball 55 is positioned on a portion of the base 30. As will be described below, pivot ball 55 has a resistive force providing means acting on it to provide the resistive support to the mechanism. Various ways of implementing the resistive force providing means are contemplated. The resistive force providing means is preferably implemented by way of a resistance cartridge 40 that acts on the pivot ball 55. In this manner, the resistive and/or dampening forces are exerted perpendicular to the vertical plane of the mounting surface 45 resulting in a more stable and controlled ride compared to prior art devices. For example, the aforementioned Thole patent allows the resilient material as therein arranged to undergo various compression and torque forces resulting in various compression and torque forces being applied to the resilient material.

In the embodiment of FIG. 2B, a resistance cartridge 40 is fixedly connected to the mounting surface 45 in a manner that allows the resistance cartridge 40 to undergo tilt and/or rotational-movement relative to the base 30 and to apply a resistive force on the base 30 as the resistance cartridge 40 and therefore the mounting surface 45 undergoes relative movement with respect to the base 30. The resistance cartridge 40, provides the core functionality of the resistive support mechanism of the invention. In this embodiment, the resistance cartridge 40 includes therein resilient member 65*b*, pivot ball 55, and a cartridge housing having a wall 70. The resilient member 65*b* is arranged in contact relation with the pivot ball 55, via extension member 65*a*, and with a wall 70 of the cartridge housing of the resistance cartridge 40 such that, in operation, the resilient member 65 is compressed by the relative movement between the resistance cartridge 40 and the pivot ball 55. Preferably, pivot ball 55 has a snug but sliding interface with extension member 65*a*. When the mounting surface 45 is tilted, the resilient material 65*b* is compressed between the wall 70 and the extension member 65*a*. Preferably, extension member 65*a* is formed from a rigid material that forms a ring around the pivot ball 55 and extends radially outward therefrom towards the wall 70. The sliding interface between the extension member 65*a* and the pivot ball 55 allows the entire mounting surface 45 to tilt while the resilient member 65*b* provides a dampening feature that prevents the mounting surface 45 from unrestrained movement, and permits smooth movement over the maximum range of motion to thereby provide the resistive support to the mounting surface 45, and any object attached thereto, such as seat 20 (of FIG. 1).

The resilient member 65*b* is preferably selected from the group consisting of an elastomeric ring, silicone, a gel, a series of rubber elements, and any similar materials know to have damping characteristics or otherwise able to resist relative movement when compressed or otherwise subjected to a force. It is also contemplated that a combination of resilient members may be employed to vary the resistance being applied across the range of motion available. For example, the resilient member 65*b* may include a first resilient member in contact relation with the extension element 65*a* and a second resilient member in contact relation with the wall 70. In a preferred embodiment of the invention, the resilient member 65*b* is a viscoelastomeric material bonded to the wall 70 and to the extension element 65*a*. The use of a viscoelastomeric material provides a damping effect where the material deforms, absorbs and distributes more of the load as it is compressed and slowly recovers when the load is removed. The result is that when the resistive support mechanism 40 is returning to a home position, the movement back to the home position is dampened and controlled based on the material properties. The use of a viscoelastomeric material allows the rate of resistance to be accentuated such that the flow properties of the resilient member are more prominent, thus providing for increased dampening. That is, viscoelastomeric materials have a response that exhibits both viscous and elastic properties when a load is applied and therefore hysteresis is observed.

Wall 70 of the resistance cartridge 40 includes an outer surface that is capable of sliding vertically within the housing 60 to thereby permit the resistance cartridge 40 to have its vertical position adjusted within the housing 60, as will be described in further detail below. In a preferred embodiment, the resilient member 65*b* is a viscoelastomeric ring, and the extension element 65*a* is a rigid material in a ring shape articulating with the pivot ball and radiating outward to compresses the resilient member 65*b* having damping properties. It is also contemplated that the second resilient member may be provided that includes a plurality of gels in contact with each other and/or the leading edge of the extension member 65*a*. Where a plurality of gels are included, it is preferably that the gels further away from the pivot ball 55 will have a higher density than those gels closer to the pivot ball 55, although variations of this are considered within the scope of the invention. This permits the resistance to tilting to be greater as the degree of tilt increases.

Furthermore, the provision of the resilient members 65 as herein described allows the mounting surface 45, and the seat 20 mounted thereon, to be biased towards a home position, having no tilt or rotational due to pre-compression of the resilient members 65. Thus, if a user seated in the chair leans in one direction and is supported there by the resistive support mechanism as described, but subsequently stands up, the seat will return to an unbiased home position.

Figure 3A:
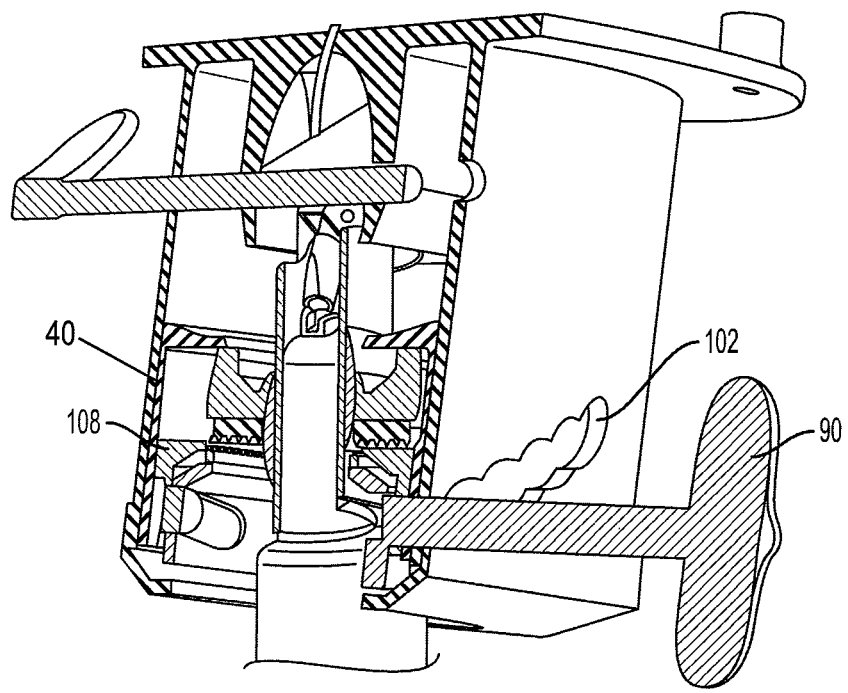
FIGS. 3A and 3B are sectional and side views, respectively illustrating a resistance varying means according to one aspect of the invention.
Figure 3B:
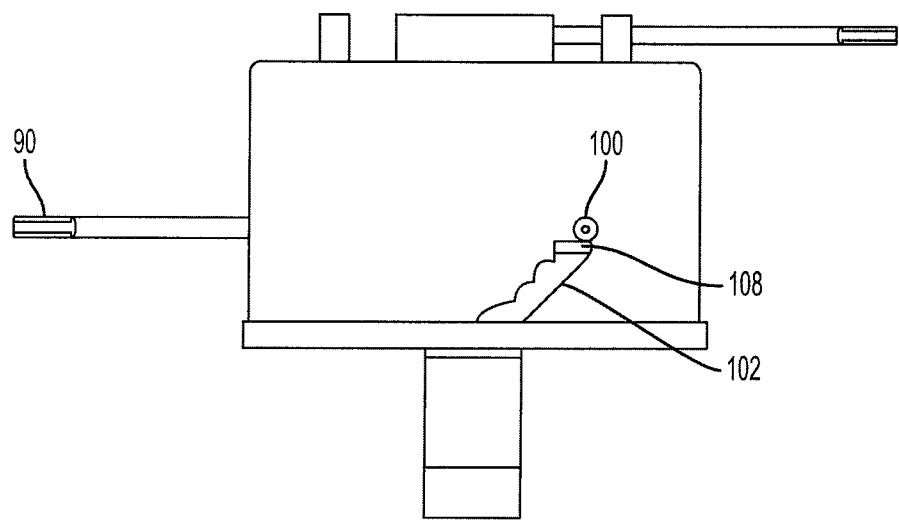

According to an aspect of the invention, a means for varying the resistive force acting on the pivot ball 55 is provided. This allows the resistance applied by the resistive cartridge to be increased or decreased depending on, for example, the intended use of the resistive support mechanism or the user. In the case of a chair, a larger user may require a higher resistive force than a small sized user. In addition, regardless of size, the user may wish to have more or less resistance, which will allow them the possibility of more recruitment of core musculature to affect an exercise phenomena, and opportunity to mobilize the joints of their pelvis and vertebral regions and or a reduction of forces experienced on the sitting support soft tissue and joints in question when the user may otherwise be required to make repetitive movements as may be best illustrated by the work of a dental hygienist as an example. In the illustrated embodiment of FIG. 2B, the means for varying the resistive force includes a spring 80 compressed between a bottom surface 85 of the housing 60 and an underside 95 of the resistance cartridge 40. In order to vary the force applied to thereby vary the resistive force in the resistance cartridge, a resistance lever 90, functionally attached to an interface plate 95 is preferably provided. The resistance lever 90 is adapted to be moveable to vary the position of the interface plate 95 under urging of the spring 80, and thereby to vary the position of the resistive cartridge 40 with respect to the base 30. As will be appreciated by a person skilled in the art, the position of the resistance cartridge 40 with respect to the base 30, that is, how far up the base 30 the resistance cartridge 40 acts, is determinative of the effective resistive force applied by the resistance cartridge 40, since the point of tilt/rotational is fixed. That is, the effective distance between the pivot ball 55 and the support bearing 50 is determinative of the resistive force applied by the resistance cartridge 40. Referring to FIGS. 3A and 3B, spring 80 (not shown for ease of illustration) is used to bias the underside 95 of the resistance cartridge 40 and all parts internal thereto, within housing 60, to an uppermost vertical position, as would be dictated by the position of the lock pin 100, within helix 102. In this embodiment, the position of pin 100, along the steps of helix 102, may be set by adjusting saddle 108 by moving resistance lever 90 within the steps of the helix 102. It should be noted that helix 102 is provided on both sides of the resistance cartridge 40, with one side including steps within which to move the lever 90 and the other side include corresponding steps within which pin 100 is provided to fix the other side within a corresponding step. It will be appreciated by a person skilled in the art that there is greater resistance in the system when the pin 100 is at a lower step within the helix 102, since the resistance cartridge 40 is further away from the point of rotation/tilt.

Figure 4A:
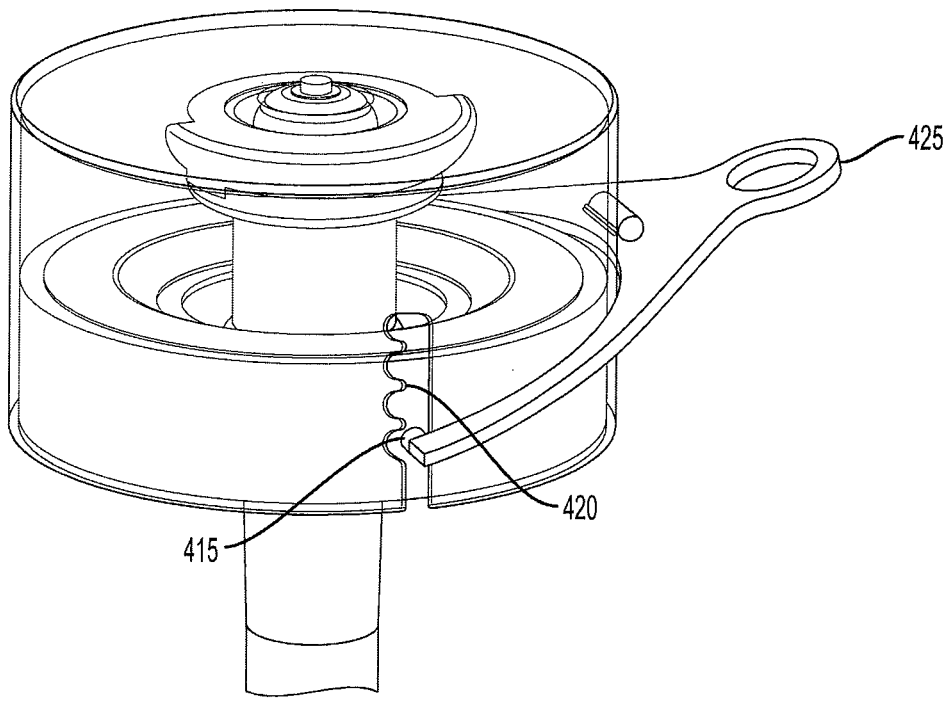
FIGS. 4A and 4B are sectional and side views, respectively illustrating a resistance varying means according to another aspect of the invention.
Figure 4B:
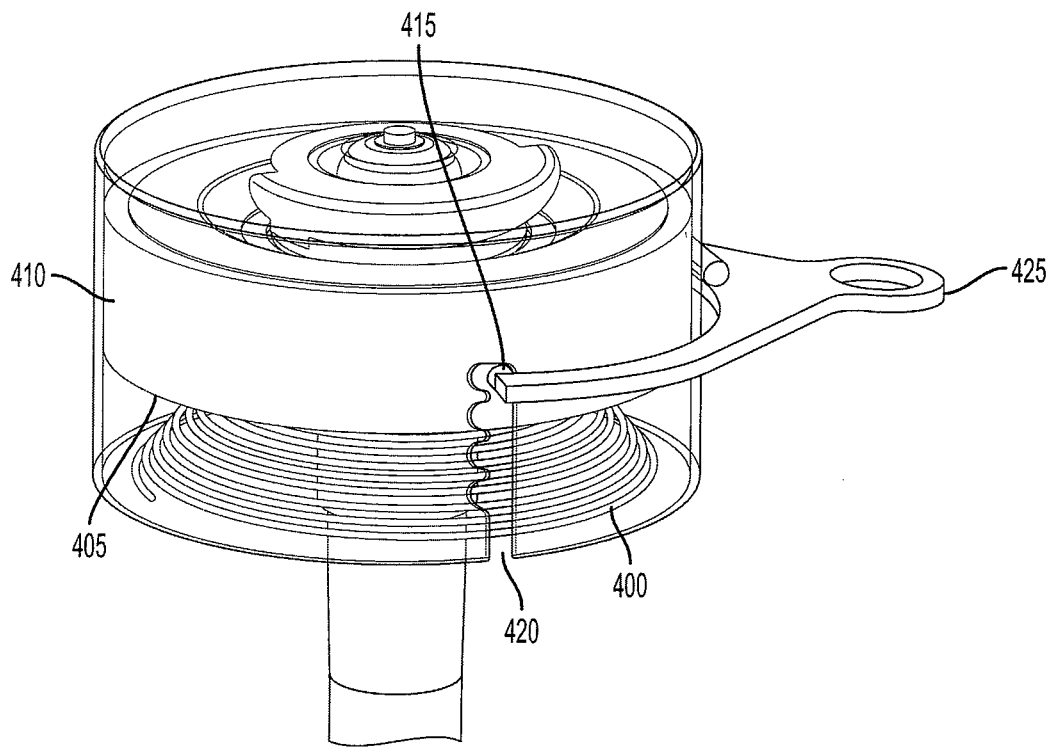
Figure 5A:
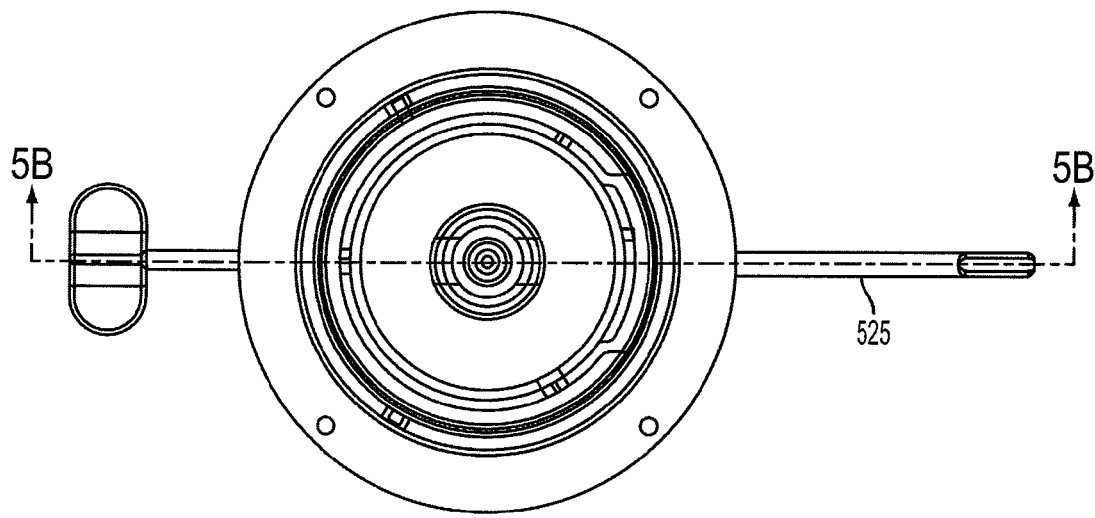
FIGS. 5A and 5B are top and sectional views, respectively illustrating a locking means according to an embodiment of the invention.
Figure 5B:
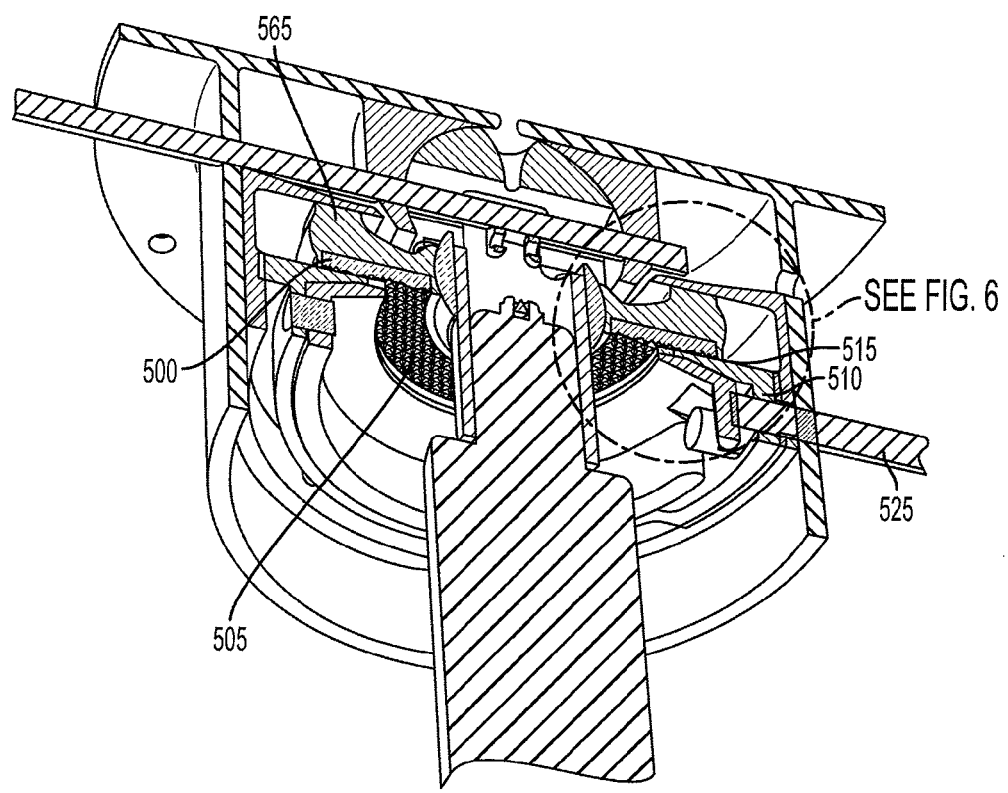
Figure 6A:
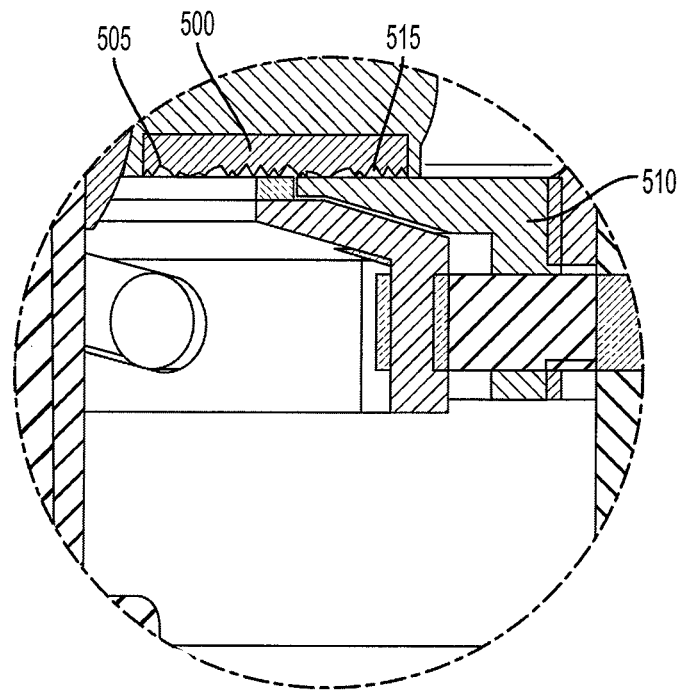
FIGS. 6A and 6B are detail views showing a portion of FIG. 5B when the locking means is in the locked and unlocked position, respectively.
Figure 6B:
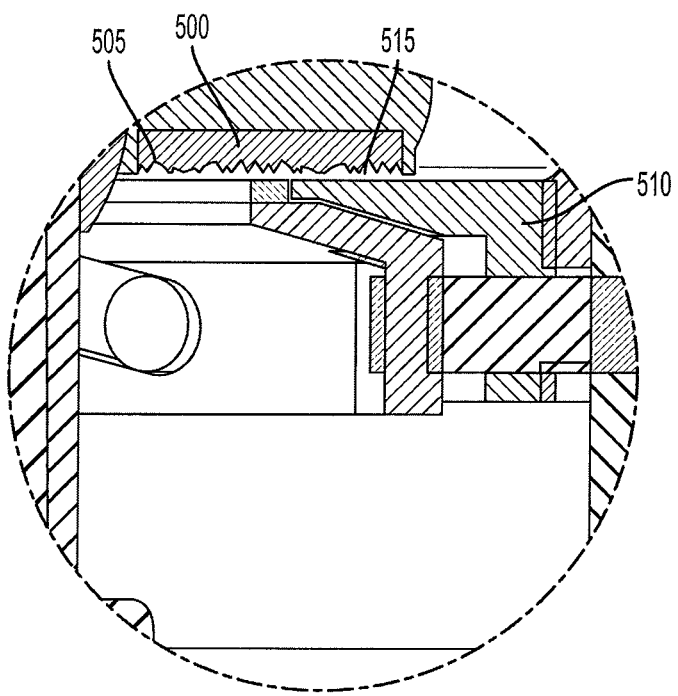

Various other implementations and embodiments of the invention are described below, however, the principle of operation in that there is a support bearing and a pivot ball provided as described above. Furthermore, there is preferably provided a means for varying the resistive force by varying the distance between the pivot ball on which the resilient material acts, and the support bearing. Referring now to FIGS. 4A and 4B, there is shown a variation of the means for varying the resistive force in which a spring 400 acts on an underside 405 of the cartridge housing 410 to bias the cartridge housing 410 to an uppermost position in a similar manner as described with respect to FIG. 3. In this embodiment, however, the height of the cartridge housing is limited by the position of lever stops 415 within the series of steps 420. Lever 425 is moveable such that lever stops 415 may be brought to rest on a desired step 420. Accordingly, spring 400 exerts an upwards force on the resistance cartridge 440 such that resistance cartridge 440 is positioned at a location limited by the particular step in the series of steps 420 in which the lever stops 415 are positioned.

According to another aspect of the invention, a means for locking the resistance cartridge 40 at a any position in which the mounting surface 45 has undergone movement relative to the base is also provided. Such a locking means provides the benefit of allowing the seat, or other apparatus mounted on the mounting surface 45 to be locked in position, and to therefore prevent the mechanism from returning to its home position. The different embodiments of the means for locking herein described permit locking in either predetermined incremental positions, or at a free floating position. The inclusion of a means for locking may be of particular benefit where the resistive support mechanism is deployed in environments where it may not always be beneficial for the resistive functionality to be active, or in the alternative, to provide additional functionality whereby the mechanism may be locked at any position of tilt or rotation-during use.

Figure 11:
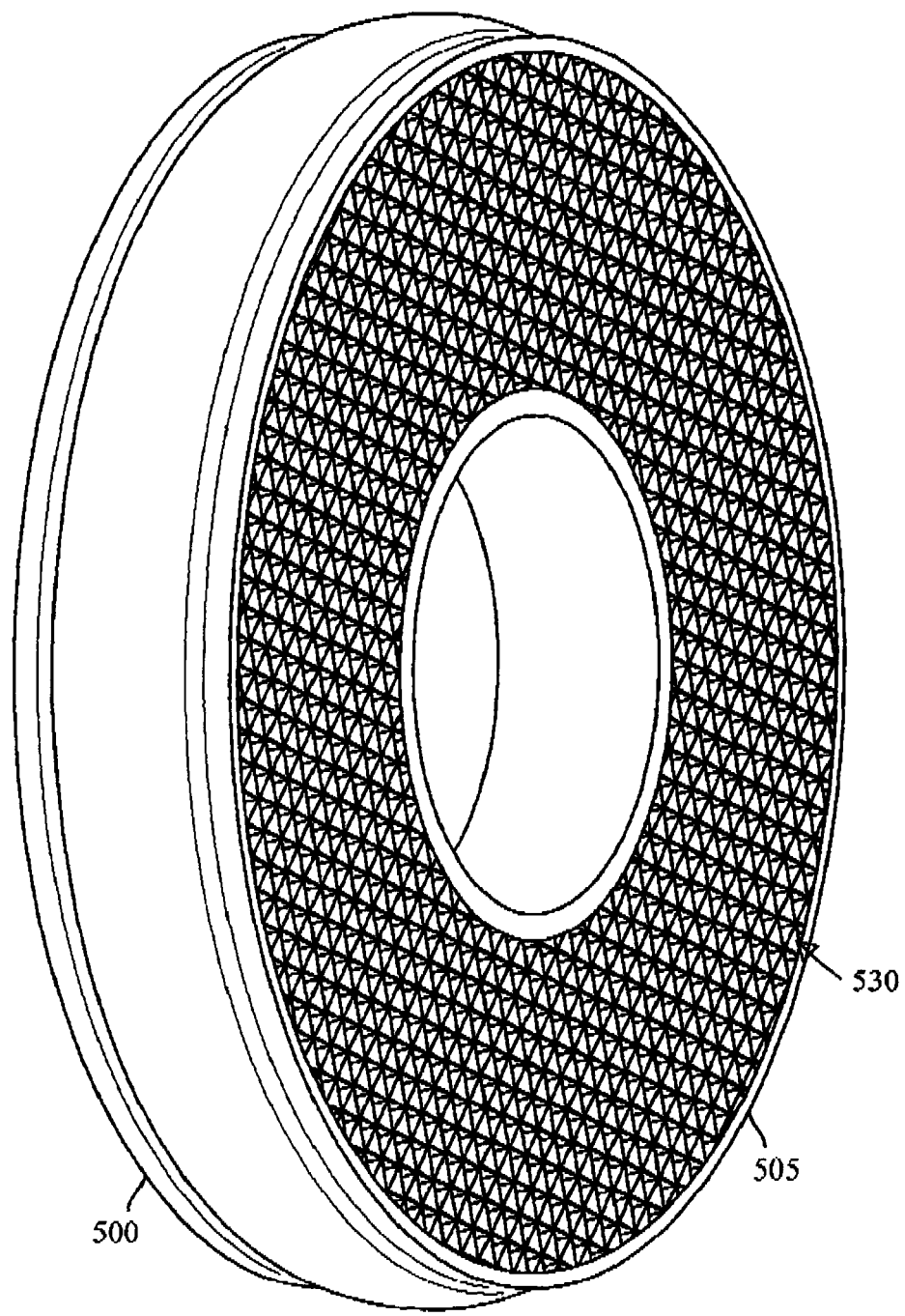
FIGS. 11 and 12 are detail views of elements of the locking means of FIG. 5.
Figure 12:
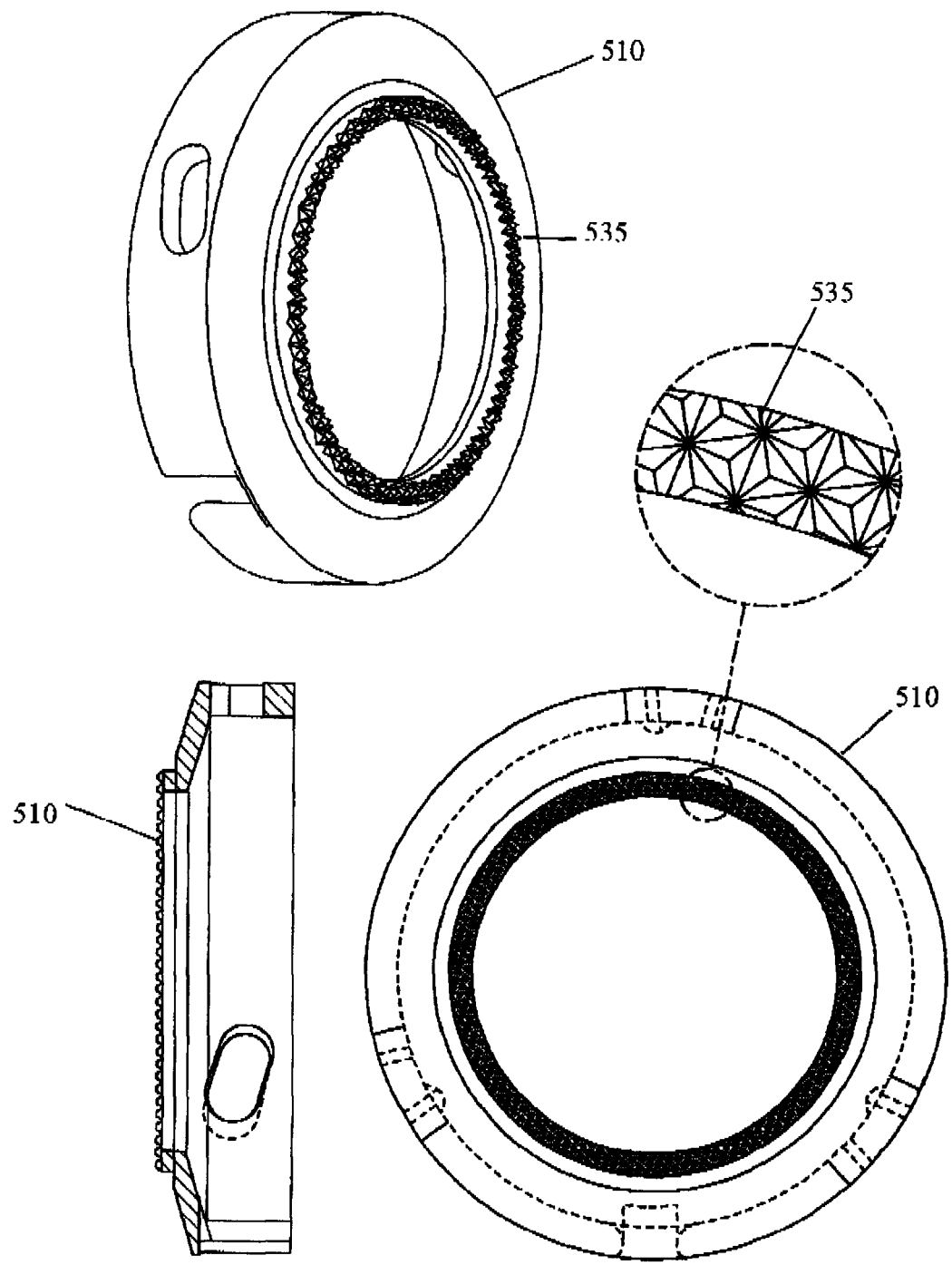

Referring to FIGS. 5A, 5B and 6A, 6B, there is shown an embodiment of the locking means according to the invention. The resistive support mechanism of this embodiment includes, within the resistive cartridge, a rigid plate 500 positioned at underside of the extension member 565. The rigid plate 500 has a surface having a plurality of locking elements 505, 515 on a surface distal to the contact surface with the extension member 565. In order to lock the resistive support mechanism in position, a locking pad 510 having a surface of complimentary locking elements 535 (shown in FIG. 12) is provided and adapted to be brought into contact with the plurality of locking elements 505, 515 of the rigid plate 500. When the locking elements 505, 515 are engaged with the complimentary locking elements 535, further tilt and/or rotational motion is prevented. An exemplary embodiment of the rigid plate 500 having the plurality of locking elements 505 is shown in FIG. 11. In the illustrated embodiment, the plurality of locking elements 505 is provided by a knurled surface 530 on an underside of the rigid plate, as illustrated. A corresponding locking pad 510 is shown in FIG. 12, having a ridged knurled portion 535 that may be brought into and out of contact with the knurled surface 530 of the rigid plate 500. These surfaces described as the locking elements may also incorporate various alternative shapes and materials and combinations that provide a similar locking feature. One example, of an alternative locking pad and locking elements that may be used in an analogous manner as that described above are those referred to as reclosable fasteners such as that sold under the trade name Dual Lock™ by 3M™.

Other locking means contemplated include systems similar to bicycle disk brakes, multi layer compression plates and rotors and pads, all of which may be applied to the invention in a manner analogous to the Preferably, the locking means of the invention is capable of being activated in either predetermined increments or at random engagement points as will be possible in the various embodiments described herein.

Referring back to FIG. 5B, a brake lever 525 is provided that is adapted to raise and lower the locking pad 510, for example, by way of a twist motion that activates a cam mechanism to thereby bring the complementary locking elements 535 of the locking pad 510 into and out of contact with the knurled surface 530 of the rigid plate 500. Referring to the detail of FIG. 12, one embodiment of a means for adapting the brake lever 525 to be raised and lowered in this manner is the provision of an angled slot 540 that is sized and otherwise dimensioned to be friction fit with the brake lever 525. Sliding the brake lever 525 on an upwards incline will bring the locking pad 510 into contact with the knurled surface 530, while sliding the brake lever 525 on a downwards incline will disengage the locking pad 510 from the knurled surface 530. The angle of the slot and dimensions of the slot and the brake lever 525 will be determined in such a manner that the brake lever requires a minimum force to activate that is greater than the forces applied during operation to prevent accidental movement of the brake lever 525.

Having thus described a presently preferred embodiment of the invention, including the resistance cartridge, and optional means for varying the resistance and for locking the motion support mechanism in a particular position, various alternatives will now be described. Specifically, the alternatives relate to alternate means for varying the resistance and/or for locking the motion support mechanism. It will be understood by those skilled in the art that the invention is not limited to particular combinations of the embodiments of the resistance cartridge, means for varying the resistance and means for locking in the combinations as described. Combinations of the resistance cartridge, means for varying the resistance, and means for locking that are herein described are contemplated by the invention, which is only limited by the claims at the end of the specification. In the description that follows, elements common to the description above are not described in further detail, and their operation will be apparent to a person skilled in the art, having regard thereto.

Figure 7A:
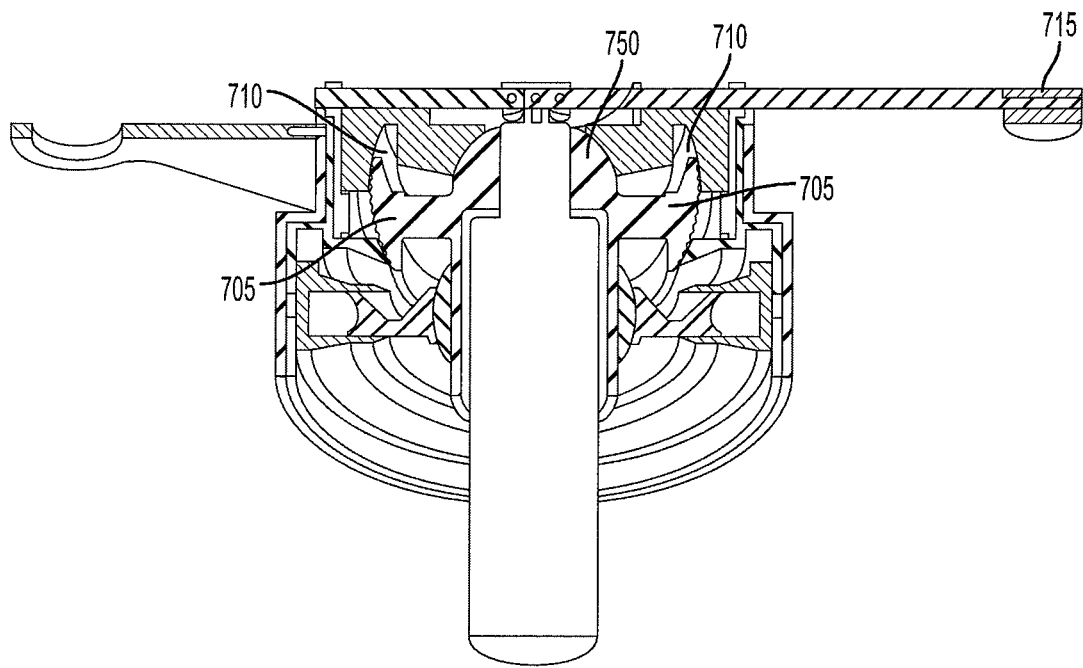
FIGS. 7A and 7B are sectional views of an alternative locking means in the unlocked and locked position, respectively.
Figure 7B:
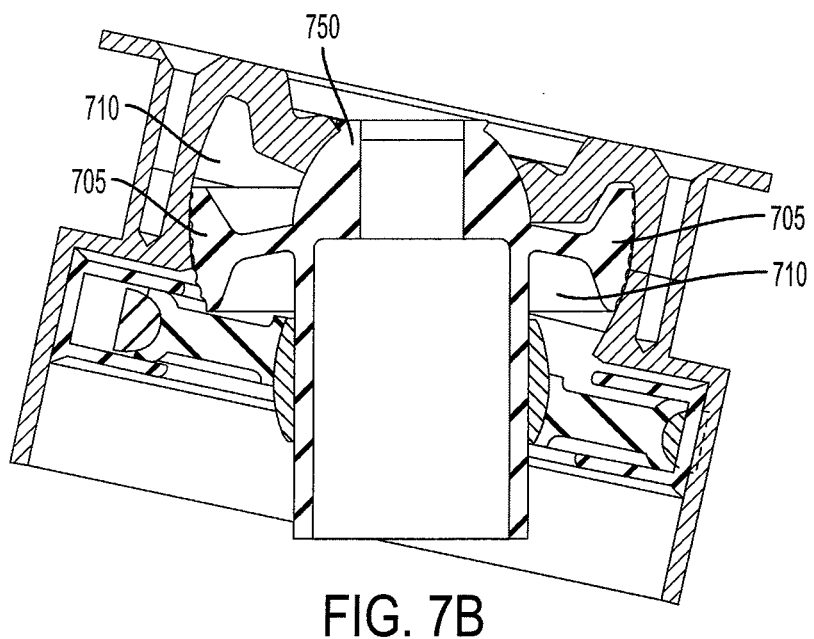
Figure 8:
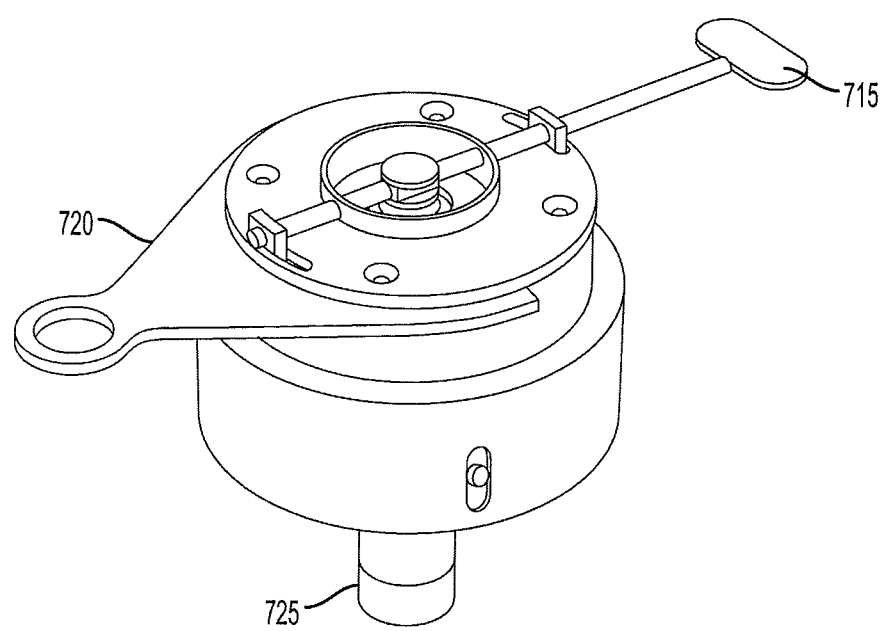
FIG. 8 is a perspective view of the resistive support mechanism according to another embodiment of the invention.

Referring now to FIGS. 7A and 7B, there is shown an embodiment of the invention in which a support bearing 750 includes one, and preferably two bearing protrusions 705. The resistance cartridge preferably includes corresponding locking surfaces 710 that provide a region of contact with the bearing protrusions 705 that is adapted to be brought into a friction fit contact relationship with the protrusions 705 when a means for locking is activated. In order to activate the lock, an adjustment lever 715 is provided to displace the resistance cartridge to a position in which its motion is locked. The adjustment lever 715 is adapted to apply a rotational motion by rotating the bearing protrusions 705 into contact relationship with the locking surfaces 710. FIG. 8 shows a resistance cartridge according to this embodiment. Lever 715 may be rotated about a generally horizontal axis to permit the lever 715 to move, and then may be rotated about a generally horizontal axis to engage the locking features as described above. In this manner, the locking mechanism, that is the lever 715, may be activated and deactivated as required by a user by rotation about the horizontal axis, and may be used to effect locking by rotation about the vertical axis. Also shown in FIG. 8, is a force adjustment lever 720 for raising or lowering the resistance cartridge to alter the portion of the base 725 on which the resistance cartridge acts to vary the resistive forces in the motion support mechanism, as has been described above. In practice, a locking means as described and illustrated with respect to FIGS. 7 and 8 may have a maximum range of tilt around the support bearing of approximately ± fourteen degrees.

It has been discovered that adapting the resistive support mechanism according to the invention to have a range of tilt of approximately fourteen degrees allows for the effective mobilization of the joints involved to optimize the range of motion and to ensure a reasonable limit for safety considerations.

Figure 9A:
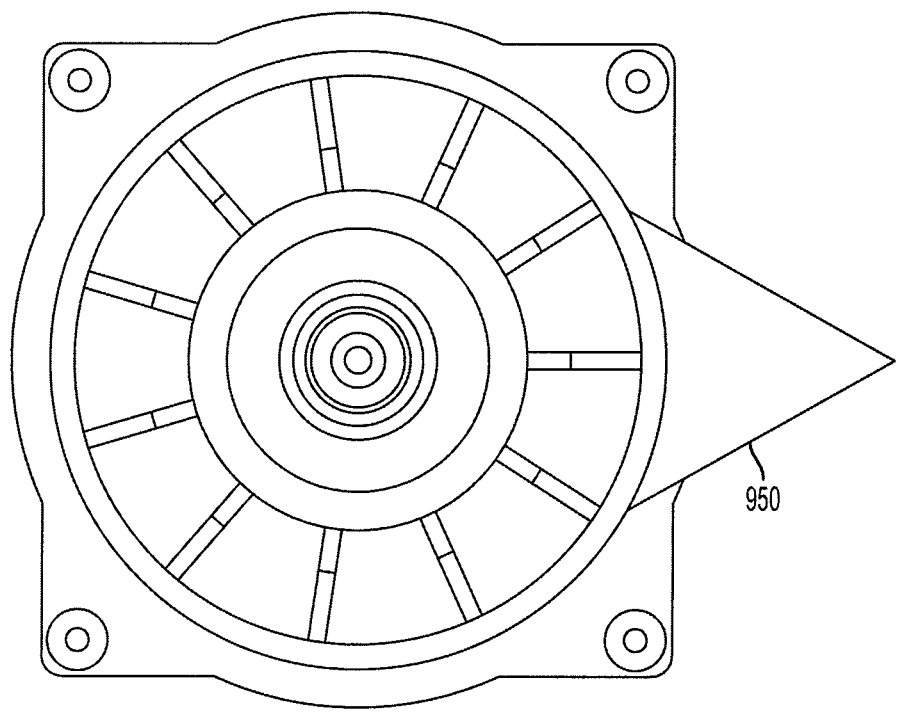
FIGS. 9A and 9B are top and sectional views according to another embodiment of the invention.
Figure 9B:
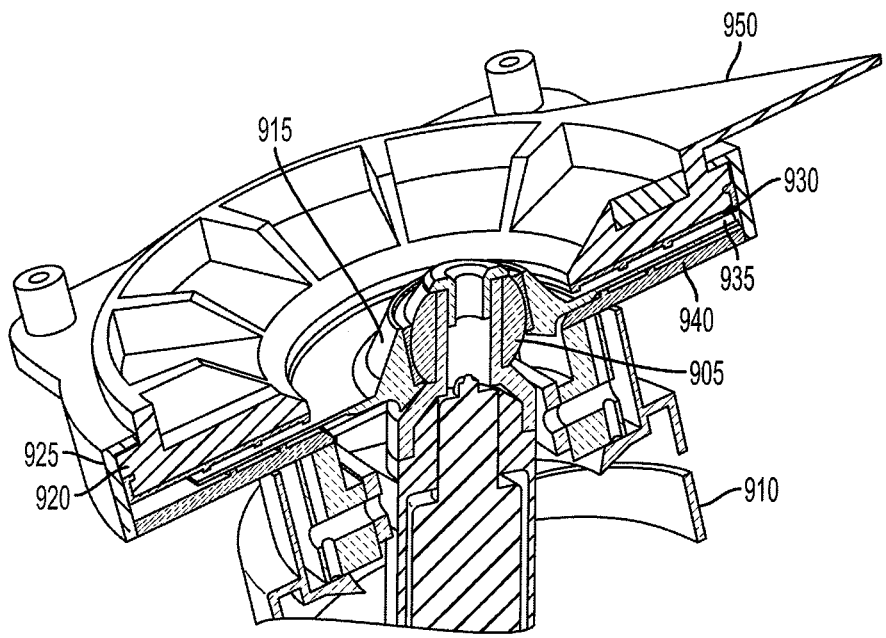

Referring now to FIGS. 9A and 9B, there is shown another embodiment of a locking means according to the invention. The locking means of FIGS. 9A and 9B includes a lock rotational ball 905 positioned above the resistance cartridge 910. The lock rotational ball 905 is generally provided as herein described as a rotational ball about which the motion support mechanism of the invention is able to tilt and/or rotate. A lower lock surface disc 915 is provided in such a manner so as to be brought into frictional contact with the lock rotational ball 905. This is generally accomplished by raising or lowering the lock body 920 into and out of contact with the housing body 925 to provide an offsetting distance between the lock body 920 and the housing body 925. This movement also transfers the load onto lock surfaces 930 on an underside of the lock body 935 on a topside 940 of the rotational disk 915. The surfaces 930 and 940 have concentric ridges to provide for additional locking force. These surfaces may include a rubber gripping layer that is deformed when the surfaces are brought into contact to provide for the additional locking. A lock lever 950 is provided to engage and disengage the lock. This can be accomplished, for example, by allowing the lock lever 950 to be rotated about the vertical axis such that such rotation causes the lock body 920 to be displaced vertically to engage or disengage the lock.

Figure 10A:
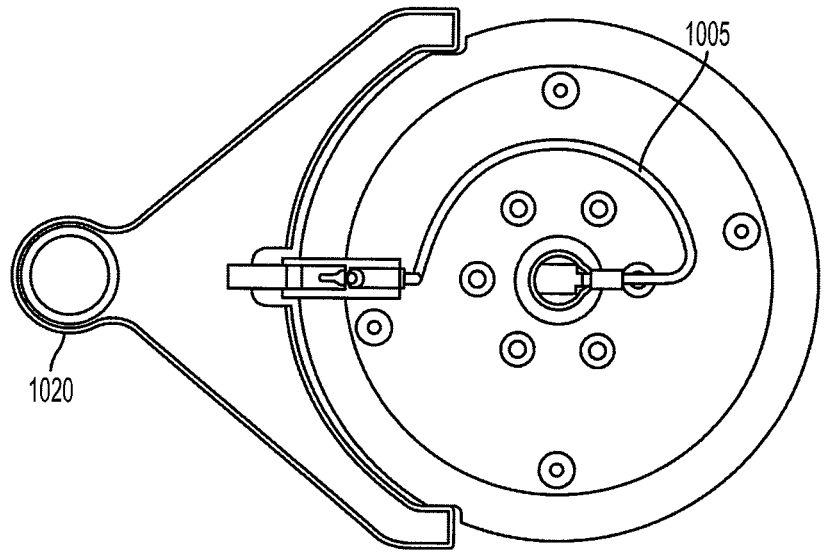
FIGS. 10A, 10B, and 10C are top, sectional and exploded views, respectively according to another embodiment of the invention that includes a height adjustment means
Figure 10B:
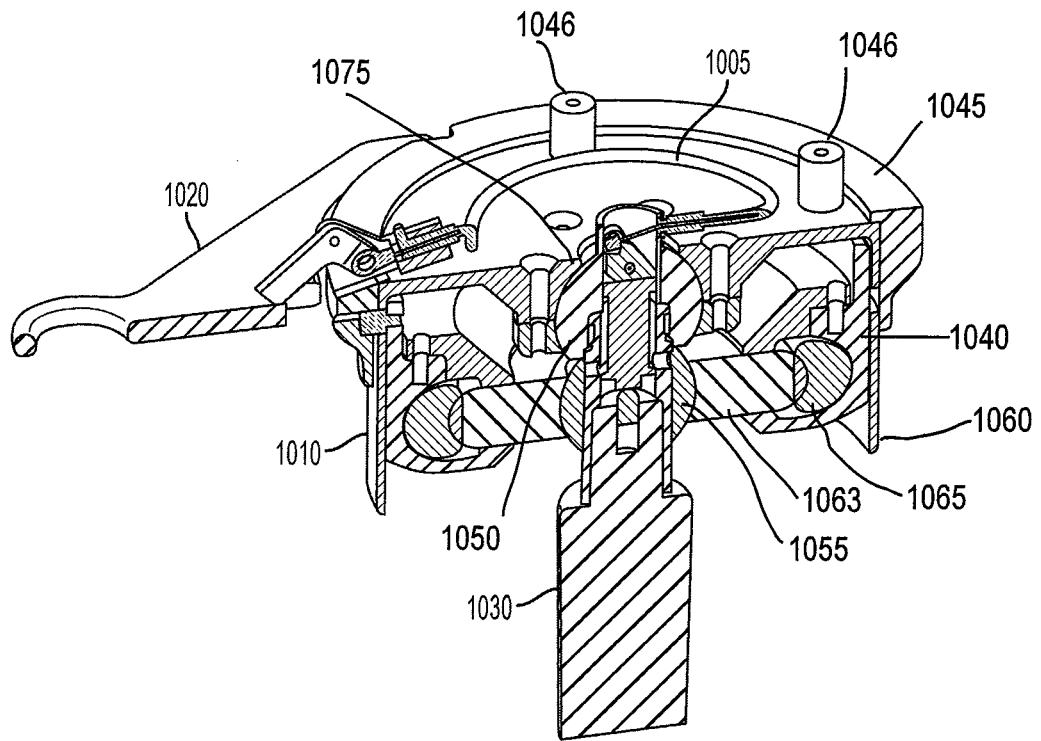
Figure 10C:
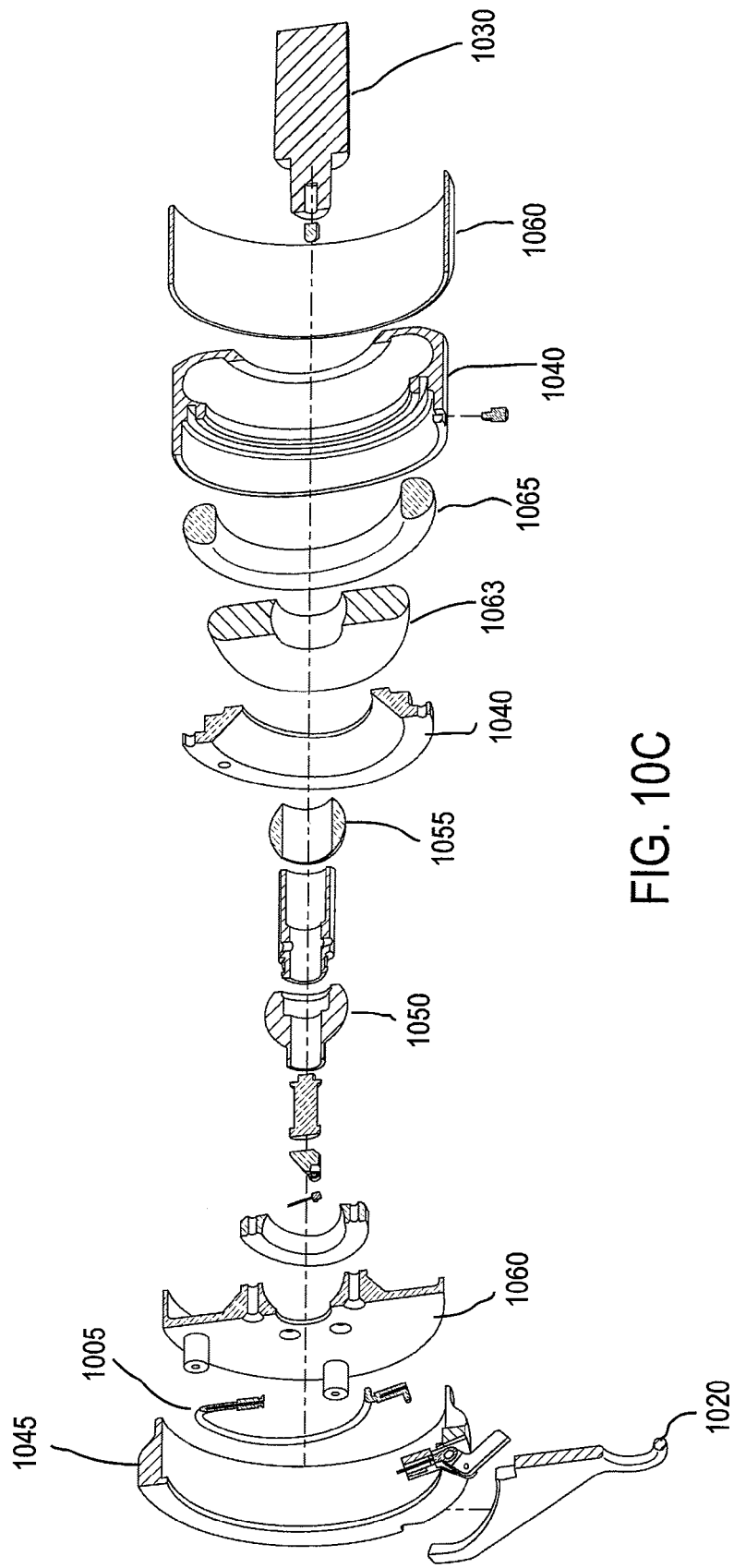

Referring to FIGS. 10A, 10B and 10C, there is shown another embodiment of the invention including a support bearing 1050 connected to the mounting surface 1045 and to the base 1030. Support bearing 1050 permits one or both of tilting and rotational motion of the mounting surface 1045 relative to the base 1030. Base 1030 does not move relative to the support bearing 1050. Mounting surface 1045 is accordingly free to tilt or rotate with respect to the support bearing 1050 such that support bearing 1050 permits one or more of rotational and tilt movement of the mounting surface 1045 relative to the base 1030. A housing 1060 having mounting surface 1045, which may include stand offs 1046 to fasten a seating surface to the mechanism, extending therefrom is preferably provided to contain within it all or most of the elements of the resistive support mechanism within the resistance cartridge 1040. Preferably, the housing 1060 also includes a bearing surface 1075 for receiving at least a portion of the support bearing 1050.

A pivot ball 1055, within resistance cartridge 1040, is positioned on a portion of the base 1030. As described with respect to previous embodiments of the invention, the resistance applied is varied by permitting the distance between the pivot ball 1055 and the support bearing 1050 to be varied, by adjusting the position on the base 1030 on which the pivot ball 1055 acts. Extension element 1063 is a rigid element extending from the pivot ball 1055 on which resilient member 1065 acts. As illustrated, resilient member 1065 is compressed between the extension element 1063 and a wall of the resistance cartridge 1040 to provide the resistance to tilt and/or rotation.

In this embodiment, there is provided a cable 1005 adapted to raise or lower the position of seat, or other surface atop the mounting surface that is being subject to resistive motion of the resistance cartridge 1010 with respect to the base 1015. The cable 1005 may be drawn by activation of the lever 1020 by rotation about the vertical axis. The cable 1005 may be provided within a cable tube, as illustrated, to prevent damage to the cable. According to the invention, rotation of the lever 1020 about the vertical axis releases and dispenses a length of the cable 1005 to activate an air cylinder atop the base 1015, which results in the cylinder being moved up or down. Various other hardware elements are illustrated, but not described as these are provided for facilitating installation or have been described with respect to previous embodiments of the invention.

The above-described embodiments are intended to be examples of the present invention and alterations and modifications may be effected thereto, by those of skill in the art, without departing from the scope of the invention that is defined solely by the claims appended hereto. For example, various materials may be used in providing the elastomeric ring or gels in the resistance cartridge described above. Furthermore, other means of providing the damping and/or resistive properties other than by way of such materials are also contemplated, for example, springs. Furthermore, other means for varying the resistance applied are also contemplated. The presently preferred embodiments as herein described are to be considered illustrative of applicant's invention. Similarly, other means for locking the support mechanism of the invention are also contemplated.

It has also been discovered that the positioning of the support bearing of the invention being immediately beneath and close to the user's centre of mass provides the unexpected benefit of more acutely affecting the mobilization of the user's joints compared to prior art mechanisms. Prior art active sitting solutions have pivot points further from the user, resulting more in a lean of the entire body of the user rather than a mobilization of critical joints.

What is claimed is:
1. A resistive motion support mechanism joined to a mounting surface and to a base for providing resistive support to the mounting surface as the mounting surface undergoes one or both of rotational and tilt movement relative to the base, the motion support mechanism comprising:
   a support bearing connected to the mounting surface and to the base which permits one or both of tilting and rotational motion of the mounting surface relative to the base;
   a pivot ball functionally attached to a portion of the base; and,
   a resistance cartridge fixedly connected to the mounting surface such that said resistance cartridge undergoes movement relative to the base and applies a resistive force on the base as the mounting surface undergoes said one or both of rotational and tilt movement;
   a means for varying said resistive force;
   wherein said resistance cartridge includes:
      a cartridge housing; and, a resilient member in contact relation with said pivot ball and with a wall of said housing such that said resilient member is compressed by the relative movement between said resistance cartridge and said pivot ball to thereby provide the resistive support to the mounting surface;

wherein said means for varying said resistive force includes a means for varying the distance between said support bearing and said pivot ball such that said pivot ball is functionally attached at a variable position on said base.

2. A mechanism according to claim 1, wherein said resilient member is selected from the group comprising an elastomeric ring, a silicone member, a dampening gel, a viscoelastomer, a bonded dampening material and a combination of same.

3. A mechanism according to claim 1, wherein said pivot ball comprises a rigid extension element and said resilient member is in contact relation with said rigid extension element and with said wall of said housing.

4. A mechanism according to claim 1, wherein said mounting surface is adapted to mount the base of a seat thereon, and said base comprises the base of a chair.

5. A mechanism according to claim 1, wherein said resilient member is adapted to bias said mounting surface to a home position.

6. A mechanism according to claim 1, wherein said resilient member comprises two or more gels in contact relation with each other.

7. A mechanism according to claim 6, wherein said two or more gels comprises a first gel in contact with a rigid extension element of said pivot ball, and a second gel in contact with said first gel and with said wall of said housing; wherein said second gel has a higher density than said first gel.

8. A mechanism according to claim 1, wherein said means for varying the distance comprises a spring within said housing and adapted to apply a force onto said resistance cartridge.

9. A mechanism according to claim 8, wherein said spring is provided on an interior of said housing between a bottom wall of said housing and an underside of said resistance cartridge.

10. A mechanism according to claim 9, further comprising a resistance lever in functional relationship with said spring; said resistance lever being moveable to vary the effective length of said spring.

11. A mechanism according to claim 10, wherein said housing comprises two or more stepped notches offset vertically from each other and wherein said resistance lever is moveable between each of said two or more stepped notches to vary the effective length of said spring.

12. A mechanism according to claim 11, wherein said stepped notches are further offset horizontally from each other to facilitate moving said resistance lever between each of said notches.

13. A mechanism according to claim 1, further comprising a means for locking said resistance cartridge at a position in which said mounting surface has undergone said movement relative to said base.

14. A mechanism according to claim 13, further comprising a rigid plate connected to an underside of said resilient member, wherein said rigid plate has a surface having a plurality of locking elements on a surface distal to said resilient member, and wherein said means for locking comprises a locking pad having a surface of complimentary locking elements adapted to be brought into contact with said plurality of locking elements on said rigid plate.

15. A mechanism according to claim 14, further comprising a brake lever for moving said locking pad into and out of contact with said rigid plate.

16. A mechanism according to claim 13, further comprising a protruding element extending from said support bearing, and said resistance cartridge further comprising a locking surface for receiving said protruding element; wherein said locking surface provides a region of contact with said protruding element that is adapted to be brought into friction fit contact relationship with said protruding element upon activation of said means for locking.

17. A mechanism according to claim 16, wherein said locking surface further restricts movement of said protruding element such that a maximum range of tilt around said support bearing is ±fourteen degrees.

18. A mechanism according to claim 16, wherein said means for locking comprises an adjustment lever adapted to bring said locking surface into said friction fit contact with said protruding element.

19. A mechanism according to claim 18, wherein said locking surface is provided on a portion of said housing of said resistance cartridge, and said adjustment lever comprises a lever adapted to rotate said portion of said housing into and out of said friction fit contact relationship.

20. A chair having a seat, a base, and a motion support mechanism joined to the base and the seat; said motion support mechanism providing resistive support to the seat as the seat undergoes one or both of rotational and tilt movement relative to the base, the motion support mechanism comprising:

a support bearing connected to the seat and to the base which permits one or both of tilting and rotational motion of the seat relative to the base;

a pivot ball fixedly attached to a portion of the base; and, a resistance cartridge fixedly connected to the seat such that said resistance cartridge undergoes movement relative to the base and applies a resistive force on the base as the seat undergoes said one or both of rotational and tilt movement;

a means for varying said resistive force;

wherein said resistance cartridge includes:

a cartridge housing; and, a resilient member in contact relation with said pivot ball and with a wall of said housing such that said resilient member is compressed by the relative movement between said resistance cartridge and said pivot ball to thereby provide the resistive support to the seat;

wherein said means for varying said resistive force includes a means a means for varying the distance between said support bearing and said pivot ball such that said pivot ball is functionally attached at a variable position on said base.

* * * * *